United States Patent
Hsieh

(10) Patent No.: US 7,493,502 B2
(45) Date of Patent: Feb. 17, 2009

(54) REMOTE ACCESS POWER HUB

(76) Inventor: Douglas Hsieh, 13100 Alondra Blvd., Ste. 106, Cerritos, CA (US) 90703

( * ) Notice: Subject to any disclaimer, the term of this patent is extended or adjusted under 35 U.S.C. 154(b) by 456 days.

(21) Appl. No.: 11/290,242

(22) Filed: Nov. 30, 2005

(65) Prior Publication Data

US 2007/0124606 A1 May 31, 2007

(51) Int. Cl.
 *H01K 5/02* (2006.01)
(52) U.S. Cl. .............. 713/300; 713/320; 713/321; 713/323; 713/324; 713/330; 713/340; 713/310
(58) Field of Classification Search .......... 713/300, 713/310, 320–324, 330, 340
See application file for complete search history.

(56) References Cited

U.S. PATENT DOCUMENTS

| 6,697,892 B1 * | 2/2004 | Laity et al. ............... 710/72 |
| 6,726,509 B2 * | 4/2004 | Milan ................... 439/752.5 |
| 2003/0039261 A1 * | 2/2003 | Purpura ................. 370/408 |
| 2003/0085803 A1 * | 5/2003 | Bapat ................... 340/333 |
| 2008/0077811 A1 * | 3/2008 | Dove .................... 713/300 |

* cited by examiner

*Primary Examiner*—Abdelmoniem Elamin
(74) *Attorney, Agent, or Firm*—Charles C. H. Wu; Wu & Cheung, LLP

(57) ABSTRACT

A remote access power ("RAP") hub for kiosks and information booths with multiple peripherals. The RAP hub provides power at different levels to accommodate different electronic devices and peripherals. The RAP hub also acts as a powered USB hub for connecting multiple USB devices to the devices and peripherals. The RAP hub further has communications functionality so that signals can be transmitted through a network to the hub for controlling the devices and peripherals remotely. The RAP hub is an all-in-one power hub with various power outputs and remote access command. It is designed to support and manage a number of devices and peripherals while avoiding multiple power adapters. A connector block allows the routing of power within multifunction devices, thus eliminating the need for special-ordered wiring harness.

21 Claims, 6 Drawing Sheets

RAP Block Diagram

AC-DC Power Supply Block Diagram

Relay Control Board Block Diagram

Power Distribution Board Block Diagram

Ethernet Control Board Block Diagram

REMOTE ACCESS POWER HUB

RELATED FIELD

The present invention relates to power management for multiple electronic devices, and more particularly relates to power management hubs for managing multiple electronic devices, peripherals and appliances in an electronic kiosk setting.

BACKGROUND OF THE INVENTION

It has become quite common to find an electronic kiosk, or information center, in a public area such as a shopping mall or an amusement park. The stand-alone kiosk is designed to provide useful interactive information to the visitors and tourists. Other common types of kiosks are the automated teller machines ("ATM"), automated parking meters, vending machines and electronic airport ticketing stations at airport ("eTicket"). For the sake of simplicity, all such machines are referred to as the kiosk in the following description.

An electronic kiosk is almost always equipped with a number of electronic devices and peripheral units. For example, a typical kiosk may support one or more monitors, keyboards, printers, audio-visual units, all of which require power to operate. However, not all the peripheral units operate at the same power level, e.g. 5 VDC, 9 V DC, 12 V DC or 24 V DC. As such, a central power cord is typically connected to the kiosk, which in turn provides various levels of power for the peripherals through their respective power adaptors. Such implementation tends to generate a lot of messy and disorganized cables, as well as numerous bulky adaptor units, making maintenance and repair inconvenient.

Additionally, if any one of the peripherals crashes and hangs up during operation, it would require a reboot by turning it off and on. Rebooting the peripherals usually requires the act of a human operator. If no operator can get to the unit in time, the machine is out of commission and we will have a bunch of unhappy customers because they cannot use the kiosk for its intended purposes. A conventional power strip, such as the one made by Server Technology®, can only provide remote power access, without any efficient means of management. A conventional power strip such as the Server Technology provides only AC output with a single control, which is wholly inadequate for the complexity of modern power and control connection.

Therefore, it would be desirable to streamline and simplify the cabling arrangement at the electronic kiosk.

It would also be desirable to control the electronic kiosk remotely in the event of a crash, thus minimizing the need for human intervention.

SUMMARY OF THE INVENTION

A remote access power ("RAP") hub apparatus is disclosed. The RAP hub of the present invention provides power at different levels to accommodate different electronic devices and peripherals. The RAP hub also acts as a powered USB hub for connecting multiple USB devices to the devices and peripherals. The RAP hub further has communications functionality so that signals can be transmitted through a network to the hub for controlling the devices and peripherals remotely. The RAP hub is an all-in-one power hub with various power outputs and remote access command. It is designed to support and manage a number of devices and peripherals while avoiding multiple power adapters. A connector block allows the routing of power within multifunction devices, thus eliminating the need for special-ordered wiring harness.

DETAILED DESCRIPTION OF THE PREFERRED EMBODIMENT

Figure 1:
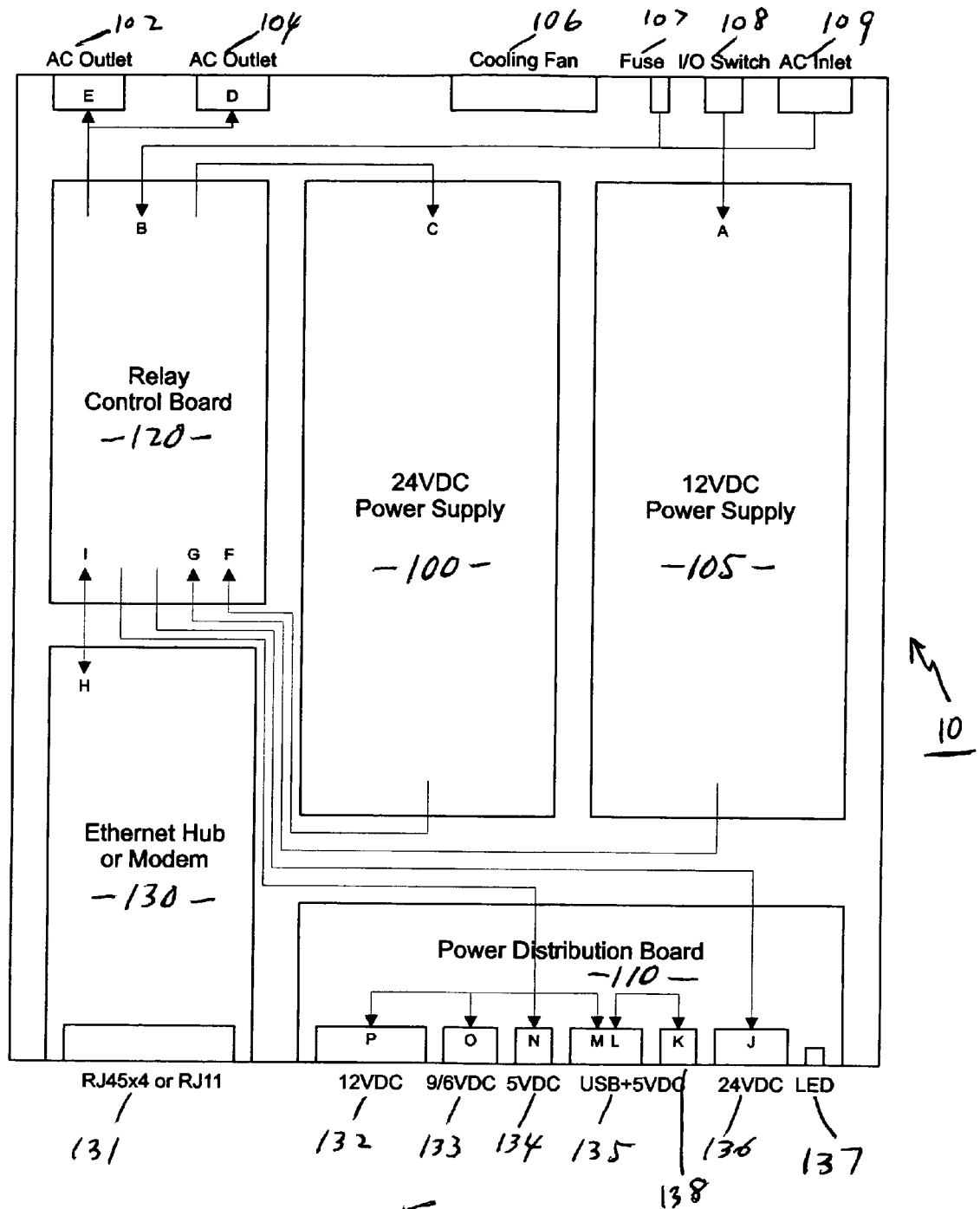
FIG. 1(a) illustrates a simplified system diagram of an exemplary remote access power hub 10 in accordance with the present invention.
FIG. 1(b) illustrates a simplified block diagram for an exemplary remote access power hub in accordance with the present invention.
Figure 1B:
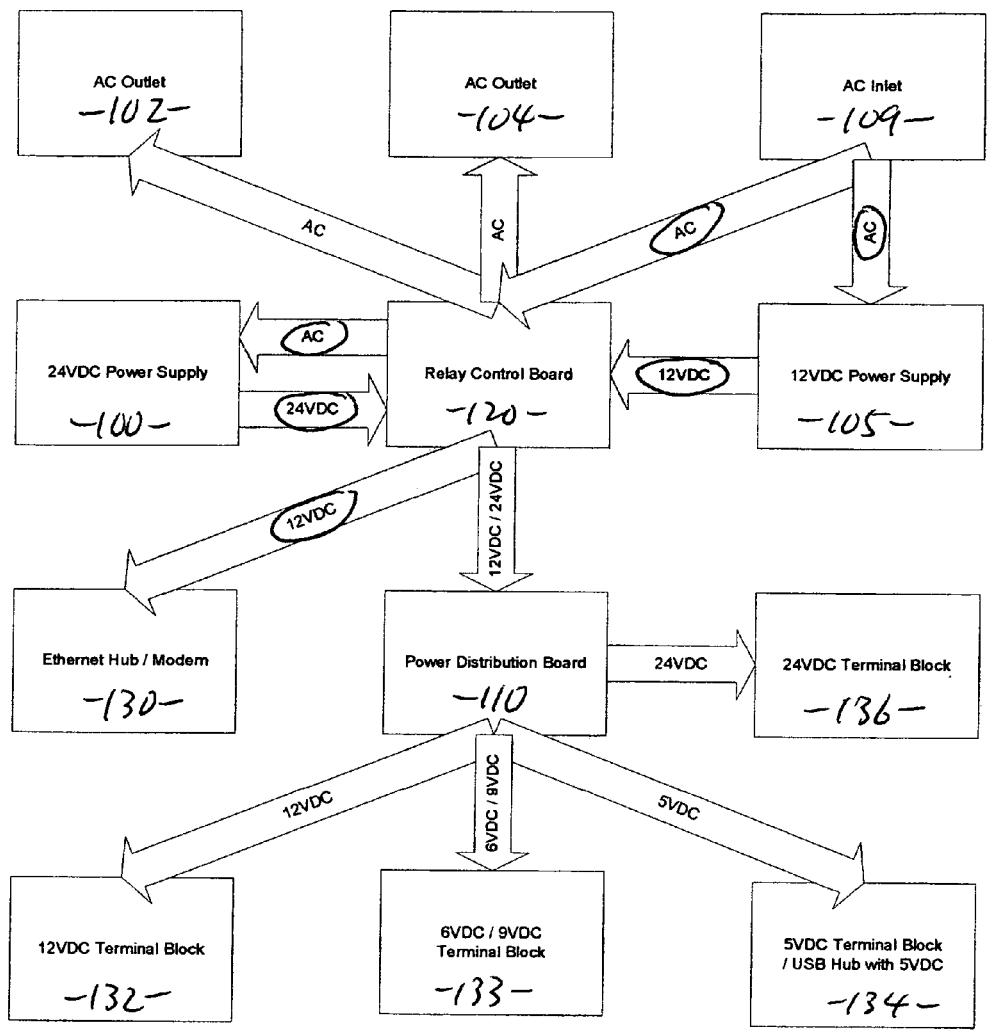

A remote access power hub is disclosed. In the following detailed description, numerous specific details are set forth to provide a full understanding of the present invention. It will be obvious, however, to one ordinarily skilled in the art that the present invention may be practiced without some of these specific details. In other instances, well-known structures and techniques have not been shown in detail so as to avoid unnecessarily obscuring the present invention.

Reference is to FIG. 1(a), where a simplified system diagram of an exemplary remote access power hub 10 in accordance with the present invention is illustrated. The power hub 10 is preferably implemented with 24VDC Power Supply 100, 12VDC Power Supply 105, Power Distribution Board 110, Relay Control Board 120 and Ethernet Hub/Modem 130, the functionality of which will be described in the following paragraphs.

At the front panel of the remote access power hub 10 (shown at the top of FIG. 1(a)), AC Inlet 109 is connected to I/O Switch 108 for providing power to the remote access power hub 10 from the outside. I/O Switch 108 is connected to 12VDC Power Supply 105 and Relay Control Board 120 for turning the remote access power hub 10 on and off. Fuse 107 is connected between I/O Switch 108 and AC Inlet 109 and Relay Control Board 120 for preventing current overage. Cooling Fan 106 provides cooling to the power hub 10. AC Outlets 102, 104 are connected from Relay Control Board 120 to provide special AC voltage levels which are not provided for by Power Distribution Board 110 of the hub 10.

At the rear panel of the remote access power hub 10 (shown at the bottom of FIG. 1(a)), RJ45 and/or RJ11 ports are provided for Ethernet or modem connection 131. Currently, four RJ45 and one RJ11 ports are implemented, although it would be readily apparent to those skilled in the art that the number of ports is application-specific. From Power Distribution Board 110, various voltage levels are provided for the devices connected to the remote access power hub 10, e.g. 12 VDC (terminal P) 132, 9/6 VDC (terminal O) 133, 5 VDC (terminal N) 134, USB+5 VDC (terminal M, L) 135, USB data-only (terminal K) 138, 24 VDC (terminal J) 136 and LED 137.

The operation of the remote access power hub 10 is now described as follows. By connecting the power hub's AC Inlet 109 to any 100V~240 AC power outlet, it powers 12VDC Power Supply 105 (through connection A) and Relay Control Board 120 (through connection B). Relay Control Board 120 then provides AC power to 24VDC Power Supply 100 (through connection C). It also provides AC power to AC Outlets 102, 104 (through connections D & E) located at the back panel of the power hub 10, thus allowing AC Outlets 102, 104 to power other external devices.

The 12VDC and 24VDC Power Supplies 105, 100 provide 12VDC and 24VDC powers to Relay Control Board 120 (through connection F & G). Relay Control Board 120 then passes the 12VDC and 24VDC power to Power Distribution Board 110.

The 24VDC power is passed to 24VDC terminal block 136 (through connection J). This power may used for devices such as ticket/receipt (thermal) printers and coin dispenser. Through Power Distribution Board 110, the 12VDC power is allocated to four different DC outputs, which are 12VDC, 9VDC, 6VDC, and 5VDC. The 12VDC power is passed to 12VDC terminal block 132 (through connection P). This power may be used for devices such as motorized card readers, bill acceptors, and monitors. The 9VDC and 6VDC powers are passed to 9/6VDC terminal block 133 (through connection O). This power may be used for speaker units. The 5VDC power is passed to 5VDC terminal block 134 (through connection N) and USB ports 135 (through connection M). This 5VDC terminal block may be used for devices such as touch-screen display units.

USB output ports 135 pass the signals from/to a personal computer through terminals 135, 138 (through connections K & L) and preferably also supply 5VDC from the power hub (connection M), thus freeing the motherboard from having to supply 5VDC. The motherboard (not shown) is typically connected to terminal 138 (through connection K). This advantageous feature reduces the load on the motherboard, making it more power efficient and reducing any damage that may occur when multiple USB devices are connected. The devices that may be connected to the USB include magnetic stripe readers, smart card readers, keyboards, track balls, touch pads, barcode readers, biometric readers, and other USB devices.

Another advantageous feature of the remote access power hub 10 of the present invention is the remote management of power ON/OFF of all outputs. Located at the left side of the front panel is Ethernet or Modem input 131. Either Ethernet or modem connections may be used to remotely manage the power hub 10. After the power hub 10 is initially powered on, if a power-on reset is required due to a hung system, all that is needed to reboot the kiosk is to establish a connection via dial-up or Ethernet, and transmit the power ON/OFF reboot command (through connections H & I). The power hub 10 will shut down, and then restore power to the outputs as shown.

Reference is now turned to FIG. 1(*b*), where a simplified remote access power hub block diagram is illustrated. As shown, Relay Control Board 120 receives 12 VDC and 24 VDC currents from 12 VDC Power Supply 105 and 24 VDC Power Supply 100, where the 12 VDC and 24VDC currents are still available when the relay is triggering.

AC currents are provided by Relay Control Board 120 to AC Outlets 102, 104, but such AC currents are not available when the relay is triggering. The 12 VDC and/or 24 VDC currents are supplied by Relay Control Board 120 to Power Distribution Board 110, except when the relay is triggering. The 12 VDC currents are supplied by the Relay Control Board 120 to Ethernet Hub/Modem 130, and remain available even when the relay is triggering. AC currents are supplied by AC Inlet 109 to Relay Control Board 120 and 12VDC Power Supply 105, and remain available when the relay is triggering. The AC power to 12 VDC Power Supply 105, to Rely Control Board 120, to 24 VDC Power Supply 100 and DC power to Ethernet Hub/Modem 130 preferably remain available when the relay is triggering. This way, the power will be back on after the power shutdown. When the relay is triggering, only the "output power" is shut down, whereas the internal power is still working. Although AC is supplied to 24 VDC Power Supply 100 indirectly from AC Inlet 109 through Relay Control Board 120 in one embodiment, AC could be directly supplied by AC Inlet 109 to 24 VDC Power 100. By going through Relay Control Board 120 as an intermediate connection, assembly is made easier.

Power Distribution Board 110 supplies 24 VDC to 24 VDC Terminal Block 136, 12 VDC to 12 VDC Terminal Block 132, 6 VDC/9 VDC to 6 VDC/9 VDC Terminal Block 133, and 5 VDC to 5 VDC Terminal Block/USB Hub 134. All these currents are not available when the relay is triggering, thus allowing the power hub to reboot the terminal blocks 132, 133, 134, 136, upon command.

Figure 2:
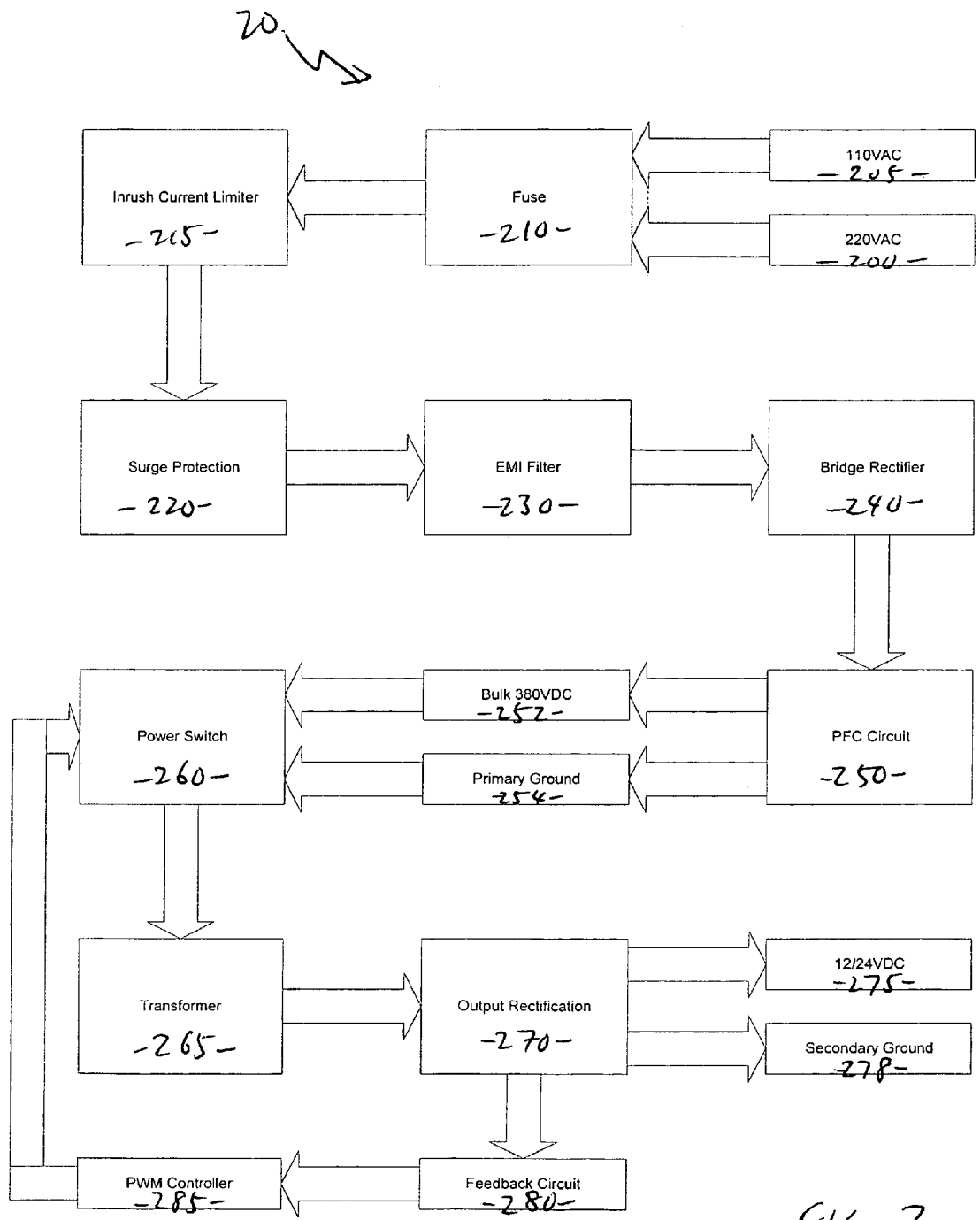
FIG. 2 illustrates a simplified block diagram of an exemplary 12VDC/24VDC Power Supply in accordance with the present invention.

Reference is now turned to FIG. 2, where the 12VDC/24VDC Power Supply (FIG. 1, 100, 105) is further illustrated in a simplified block diagram The AC-DC power supply 20 takes universal AC input from 110VAC 205 to 220 VAC 200. Such versatility makes it particularly suitable for both North American and European applications. It outputs either 12VDC or 24VDC 275 depending on the specific model number to customer kiosk peripherals. The 12VDC power supply also supplies the power distribution board to generate +5VDC, +6VDC, and +9VDC to kiosk peripherals.

The AC-DC power supply 20 shown in FIG. 2 operates as follows. The AC input (either 110VAC or 220VAC) comes from wall outlet and gets through a fuse 210 first. The fuse 210 protects the AC power line by disconnecting the power supply 20 from AC power line when a short or other event happens inside the power supply 20 and causes the AC input current to increase dramatically. When the power supply 20 presents a short to the AC power line, the fuse 210 will be burned out prior to any damage to power line.

The AC input then goes through an inrush current limiter 215 after it passes through the fuse 210. The inrush current limiter 215 is a kind of a resistor, whose resistance changes as the current flows through it. When applying an AC input to the power supply 20, there will be an inrush current spike with very high magnitude. The inrush current limiter will show a high resistance to this current, and thus limit the inrush current to a safe level.

Preferably after the inrush current limiter, there is a surge protector 220 to prevent the power supply 20 from damage when a lightning strike takes place. As it is known that when lightning occurs, the AC power line will generate a voltage spike with several thousand volts magnitude. That is called a surge. The surge protector 220 will clamp that voltage to a safe level (usually a few hundred volts) for the power supply 20.

After surge protector 220, there is an EMI filter network 230. The EMI filter 230 is used to filter out hazardous harmonic generated by the power supply 20 itself and transmitted back to the AC power line. Hazardous harmonic is pollution and noise to AC power line. The EMI filter 230 is in charge of preventing AC power line from electronic pollution generated by power supplies attached to AC power line.

Till now the power is still in the AC format. After the bridge rectifier 240, the power becomes pulsed DC and goes into PFC circuits 250. The PFC stands for power factor correction and its major function is to correct the poor power factor due to partial conduction angle of bridge rectifier diodes. The AC power line will benefit from the PFC 250 because the PFC 250 increases the power utilization of power line and decreases the harmonic to the power line. Because of the nature of PFC circuit 250, it outputs 380VDC (shown as Bulk 380VDC 252 and its reference of Primary ground) to the following DC-DC conversion stage.

The 380VDC output 252 from PFC circuits 250 applies to power MOSFET (power switch 260) via the switching mode transformer. The gate of MOSFET was controlled by a PWM (Pulse-Width-modulation) controller so the MOSFET works on on-off status with variable duty-cycle to charge and discharge the transformer 265. Energy is therefore transmitted to the secondary side of transformer 265 by changing magnetic field.

On the secondary side of transformer 265, a rectification circuit 270 consists of diode and capacitor rectifies and smoothes the pulsed DC to generate stable DC output (12VDC/24VDC 275 and its reference of secondary ground). At the meanwhile, the output DC was sampled and feedback 280 to the primary side PWM controller 285 via an optic-coupler to adjust the output pulse width of PWM controller, thus adjusting the output DC itself to an ideal level and keeping itself stable when loading on 12VDC changes dynamically.

Figure 3:
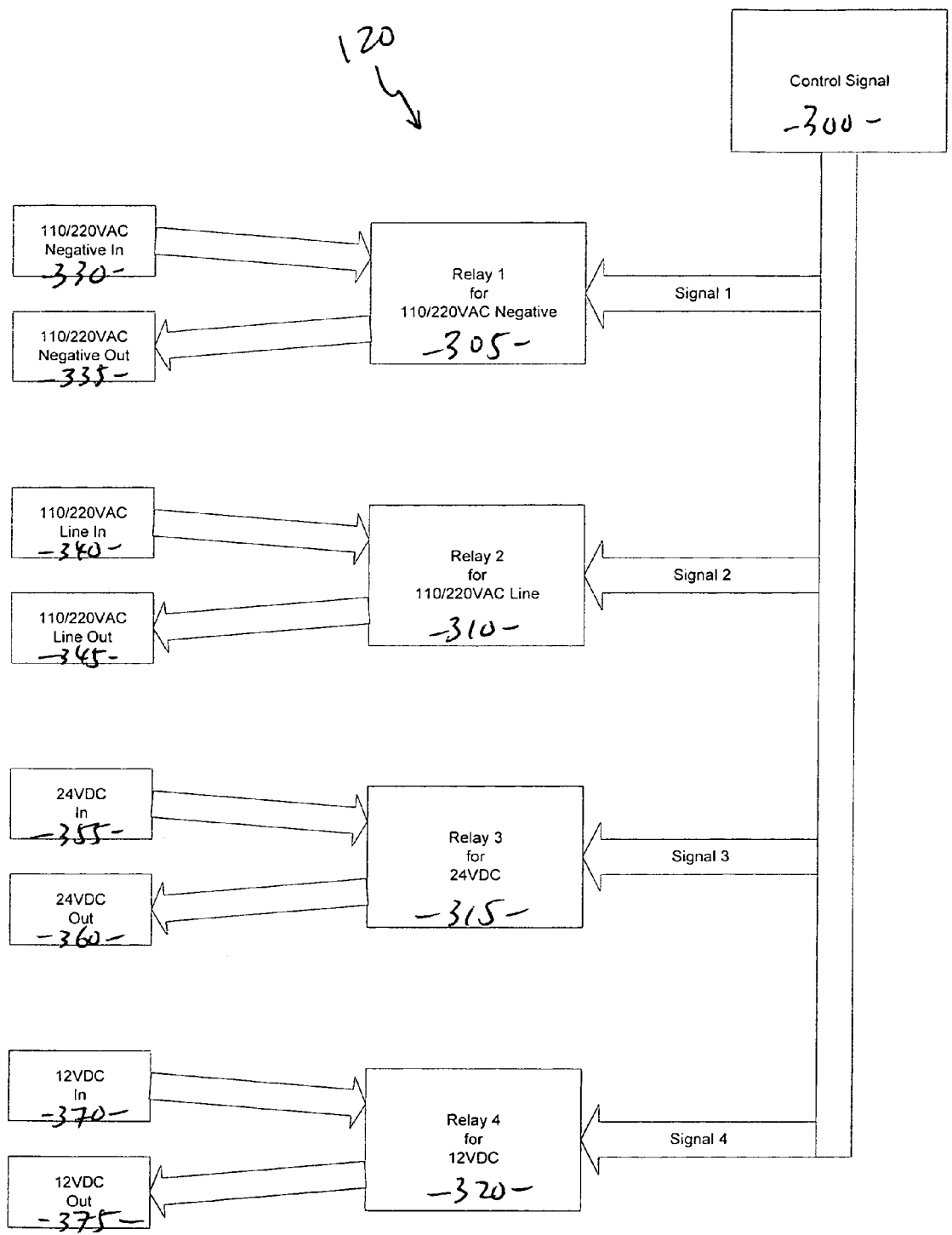
FIG. 3 illustrates a simplified block diagram of an exemplary Relay Control Board in accordance with the present invention.

Reference is now turned to FIG. 3, where a simplified block diagram of an exemplary Relay Control Board 120 is further described. As previously described, Relay Control Board 120 provides AC power to 24VDC Power Supply 100 and to two AC Outlets 102, 104. Relay Control Board 120 also passes the 12VDC and 24VDC power to Power Distribution Board 110. Relay Control Board 120 can receive control signals through Ethernet Hub or Modem 130 to manage power ON/OFF of all outputs. As shown in FIG. 3, control signals 300 are applied to control Relay 1 for 110/220 VAC Negative 305, Relay 2 for 110/220 VAC line 310, Relay 3 for 24 VDC 315 and Relay 4 for 12 VDC 320. Relay 1 305 controls the 110/220 VAC negative In 330 and Out 335. Relay 2 310 controls 110/220 VAC line In 340 and Out 345. Relay 3 315 controls 24 VDC In 355 and Out 360. Relay 4 320 controls 12 VDC In 370 and Out 375.

Figure 4:
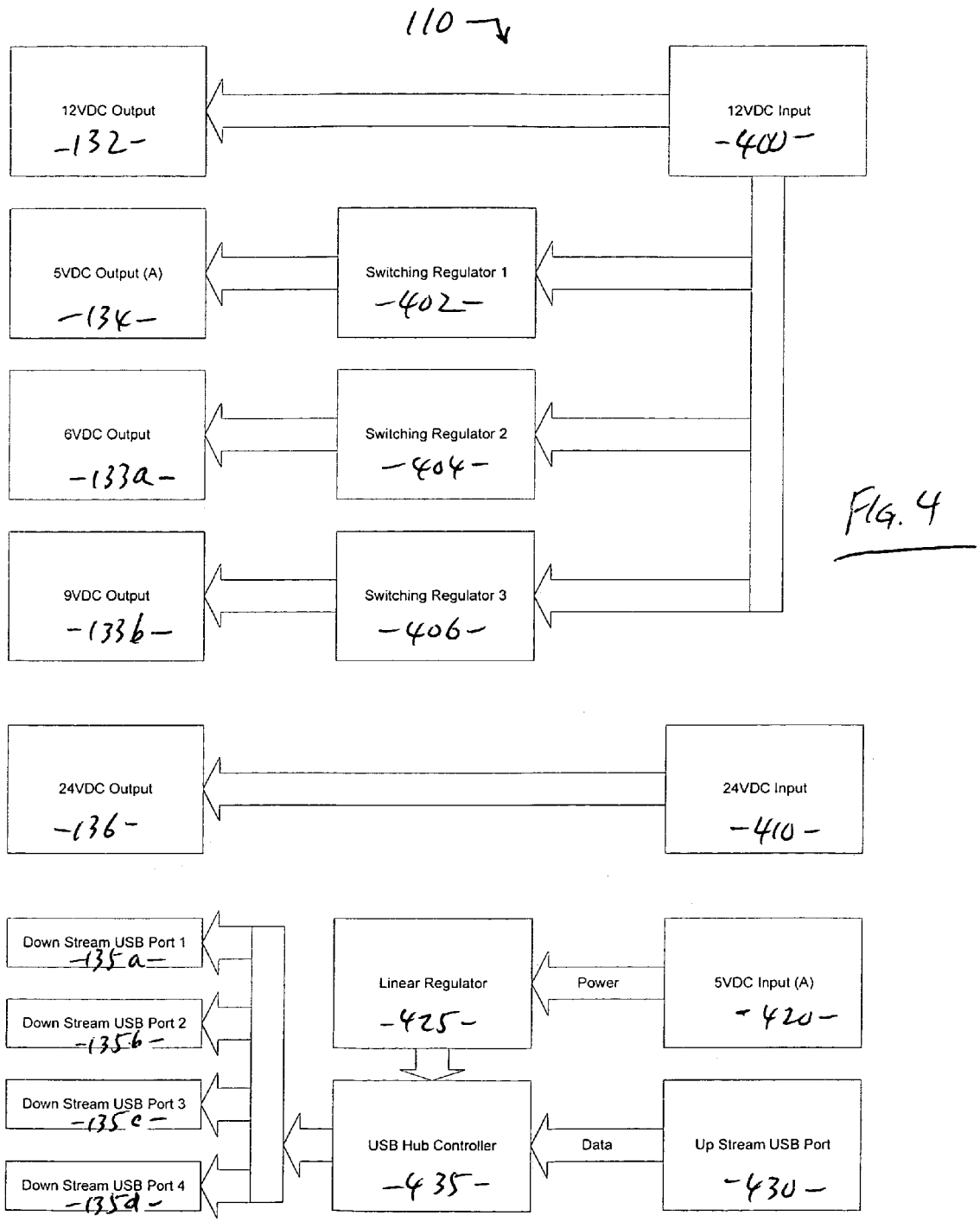
FIG. 4 illustrates a simplified block diagram of an exemplary Power Distribution Board in accordance with the present invention.

Reference is now turned to FIG. 4, where a simplified block diagram of Power Distribution Board 110 is further described. The 12VDC input 400 (from Relay Control Board 120) is used to generate 12 VDC Output 132 (without any switching regulator), 5 VDC Output 134 (through switching regulator 402), 6 VDC Output 133a (through switching regulator 404), and 9 VDC Output 133b (through switching regular 406). The 24VDC input 410 (from Relay Control Board 120) generate 24 VDC output 136. The 5VDC input 420 (from Relay Control Board 120) powers USB Hub Controller 435 and the Downstream USB ports 135a-d through Linear Regulator 425. Data stream may be supplied from upstream USB port 430 to downstream USB ports by using the power provided from 5VDC input 420. By providing 5 VDC on the Power Distribution Board 110, the motherboard of the host PC (connected to the RAP hub of the invention) is freed from having to supply 5VDC, thus avoiding draining power from the motherboard.

Figure 5:
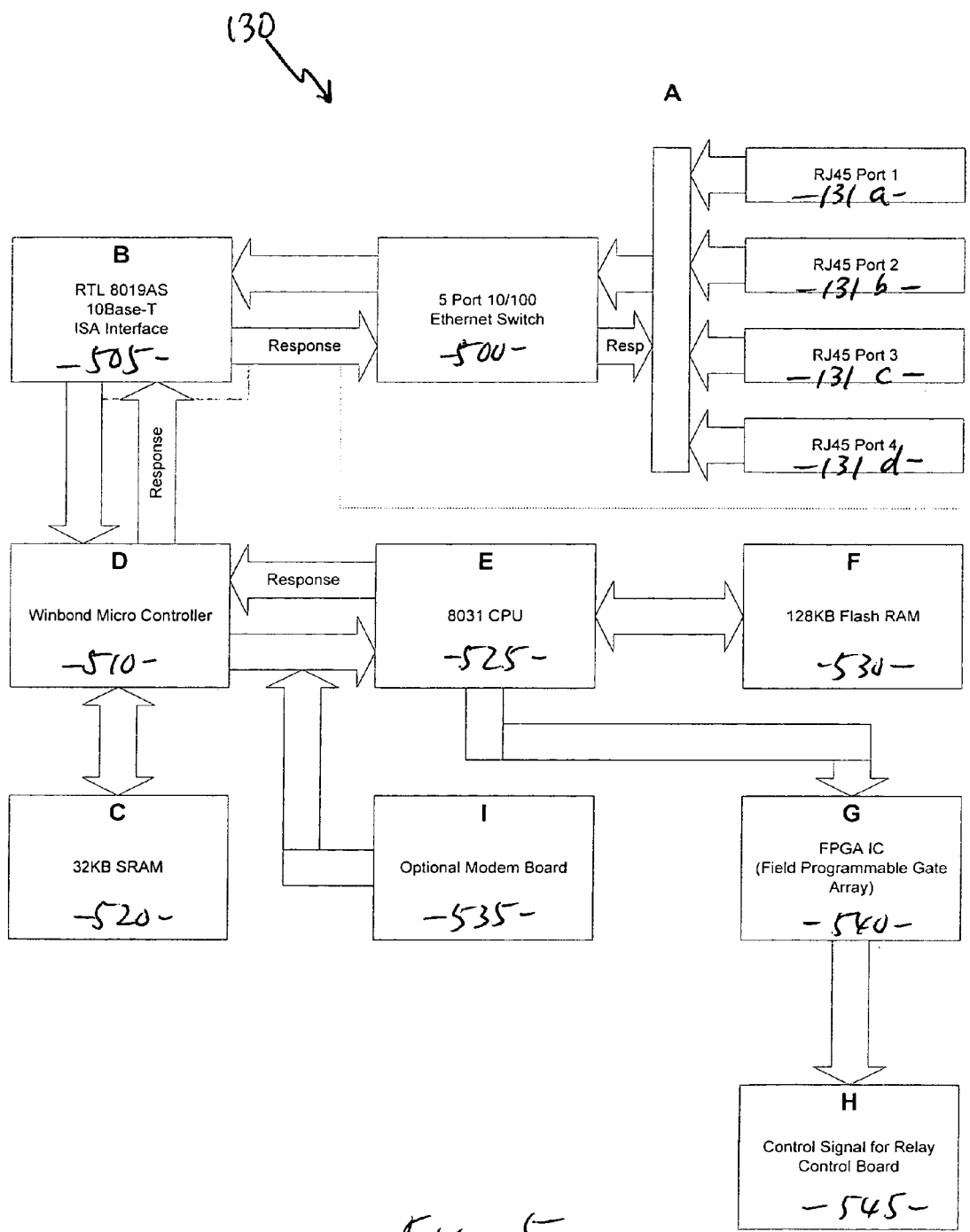
FIG. 5 illustrates a simplified block diagram of an exemplary Ethernet Control Board in accordance with the present invention.

Reference is now turned to FIG. 5, where a simplified block diagram of an exemplary Ethernet Control Board 130 is further described. Ethernet Control Board 130 is the main logic control board which receives the remote command from the Host PC. The Host PC sends the command through a Wide Area Network ("WAN") or Local Area Network ("LAN") to reach the Ethernet Control Board 130 at RJ45 Port 131a-d. It does not matter which RJ45 port is connected to the Net, through the RTL8091 chip 505 with proper IP address setup in the 32KB SRAM 520 controlled by micro controller 510, e.g. a Winbond® micro controller. Upon receipt, the command will pass through the TCP/IP protocol and convert to RS232 protocol for 8031 CPU ("central processing unit") 525 to process.

After the right command is received at the 8031 CPU 525, the 8031 CPU 525 will compare the Serial Number and Password stored in the 128KB Flash memory 530. The 8031 CPU will then respond to the command. The command preferably has tow types, one for testing the communication and another for activating the FPGA IC 540 ("field-programmable gate array integrated circuit") to trigger the relay to control the Power Off/On 545.

The response will be sent back to the host PC, which can be connected to any port of the RJ45 Ports 131a-d, from the 8031 CPU's RS232 port, through Winbond® Micro Controller 510. Its RS232 protocol is converted to TCP/IP by the RTL8019 chip 505, which is then forwarded to Ethernet Switch 500.

The Relay command will be activated by the FPGA IC 540 and control the internal 12VDC with maximum 1A load Relay. The internal relay will connect to Relay Control Board 120 to control the relay, in order to prevent the surge to directly damage the Ethernet Control Board 130.

The optional Modem Board 535 may connect to the same Ethernet Control Board 130, in addition to, or in place of, the Ethernet communication chip like the Micro Controller 510, RTL 8091AS 505, Ethernet Switch 500, and RJ45 Ports 131. Communication to the host PC will be using the LAN or WAN networks, via TCP/IP, Wi-Fi, Ethernet, public telephone line, or POTS connections, with dedicated or non-dedicated phone line. Host PC will dial the phone number to which the Modem board was connected. After the automatic connection by the Modem board 130, the Host command will be sent through the phone line and directed into the 8031 CPU 525, and then the CPU will process in the same manner as Ethernet Control Board 130.

An exemplar User's Manual for the Remote Access Power Hub in accordance with the present invention is appended to this application as Appendix A. Another exemplary RAPid™ Serve User's Manual for providing the configuration and communication utility for setting and managing the RAP device is also appended to this application as Appendix B. Both Appendices A and B are hereby incorporated by reference as if fully set forth herein.

Although the invention is described herein with reference to the preferred embodiment, one skilled in the art will readily appreciate that other applications may be substituted for those set forth herein without departing from the scope of the present invention. Accordingly, the invention should only be limited by the claims included below.

What is claimed is:

1. A remote access power hub for remotely power and control external devices, comprising:
   a housing having at least a first panel and a second panel;
   an AC inlet on said first panel;
   a first DC power supply within said housing and coupled AC inlet;
   a relay control unit within said housing and coupled to said AC inlet;

a power distribution unit within said housing and coupled to said relay control unit;

an Ethernet control unit within said housing and coupled to said relay control unit, wherein said AC inlet is disposed to receive power from an external power source and provide AC power to said relay control unit and to said first DC power supply, said AC power remaining available when said relay control unit is triggering;

said first DC power supply is disposed to receive said AC power from said AC inlet and to generate a first DC power, said first DC power remains available when said relay is triggering;

said relay control unit is disposed to receive said AC power from said AC inlet and said first DC power from said first DC power supply, said AC power remains available when said relay is triggering, said relay control unit generates a DC power to an Ethernet hub/modem unit, said DC power remains available when said relay control unit is triggering, said relay control unit generates a DC power to said power distribution unit, said DC power is not available when said relay control unit is triggering;

said power distribution unit is disposed to receive said DC power from said relay control unit and generate at least one DC power to power said external devices;

said Ethernet control unit is disposed to receive said DC power from said relay control unit and to communicate through predetermined telecomm connections, and generate control signals to control said relay control unit based on signals received from a predetermined LAN/WAN connection.

2. The remote access power hub of claim 1, further comprising:

a second DC power supply within said housing and coupled to said relay control unit, disposed to provide a second DC power supply to said relay control unit upon receiving an AC power from said relay control unit, said AC power remaining available when said relay is triggering.

3. The remote access power hub of claim 2, wherein said commands are communicated to said power hub using DTMF signals and said commands cause said relay control unit to reboot itself.

4. The remote access power hub of claim 3, further comprising at least one of the following:

at least one USB port with 5 VDC on said second panel, said USB port being disposed to receive 5 VDC power from said power distribution unit, said 5 VDC being not available when said relay control unit is triggering;

a 12 VDC terminal block, disposed to receive a 12 VDC power from said power distribution unit, said 12 VDC being not available when said relay control unit is triggering;

a 6 VDC/9 VDC terminal block, disposed to receive a 6 VDC/9 VDC power from said power distribution unit, said 6 VDC/9 VDC being not available when said relay control unit is triggering;

a 24 VDC terminal block, disposed to receive a 24 VDC power from said power distribution block, said 24 VDC being not available when said relay control unit is triggering.

5. The remote access power hub of claim 4, further comprising at least one AC outlet on said first panel for powering external devices, said AC outlet receiving AC power from said relay control unit, said AC power being not available when said relay control unit is triggering.

6. The remote access power hub of claim 4, wherein said relay control unit comprises:

control signal receive unit coupled to said Ethernet control unit, said control signal receive unit being disposed to receive said plurality of control signals from said Ethernet control unit;

first relay unit coupled to said control signal receive unit, being disposed to controllably relay a first power source in response to one of said control signals;

a second relay unit coupled to said control signal receive unit, being disposed to controllably relay a second power source in response to one of said control signals;

a third relay unit coupled to said control signal receiver unit, being disposed to controllably relay a third power source in response to one of said control signals;

a fourth relay unit coupled to said control signal receive unit, being disposed to controllably relay a fourth power source in response to one of said control signals.

7. The remote access power hub of claim 6, wherein at least one of said first, second, third, and fourth power sources is a DC power supply.

8. The remote access power hub of claim 7, wherein at least one of said first, second, third, and fourth power sources is an AC power supply.

9. The remote access power hub of claim 6, wherein said power distribution unit comprises:

12 VDC power input unit, disposed to receive a 12 VDC power from said relay control unit and generate a plurality of DC powers;

a first switch regulator, disposed to receive one of said DC powers and generate a 5 VDC output;

a second switch regulator, disposed to receive one of said DC powers and generate a 6 VDC output;

a third switching regulator, disposed to receive one of said DC powers and generate a 9 VDC output;

24 VDC power input unit, disposed to receive a 24 VDC power from said relay control unit and generate a 24 VDC output;

a linear regulator, disposed to receive said 5 VDC output from said first switch regulator and generate a regulated DC power;

a USB hub controller, disposed to receive said regulated DC power from said linear regulator;

a upstream USB port, disposed to transfer data through said USB hub controller to said USB port.

10. The remote access power hub of claim 9, wherein said Ethernet control unit comprises:

at least one communications port;

an ISA interface unit, coupled to said communications port;

a microcontroller coupled to said ISA interface unit;

a SRAM memory unit coupled to said ISA interface unit;

a CPU coupled to microcontroller;

a Flash RAM unit coupled to said CPU;

a field-programmable gate array ("FPGA") logic unit coupled to said CPU, wherein said communications port controllably connects to a predetermined network and to communicates with a predetermined host, said port receives commands in TCP/IP protocol from said predetermined host;

said ISA interface unit and said microcontroller are disposed to convert said commands from TCP/IP protocol to RS232 protocol for said CPU to operate, based on IP address setup in said SRAM memory unit;

said CPU controllably authenticates said commands in RS232 protocol based serial number and password information stored in said Flash RAM unit;

if authenticated, said CPU controllably transfers said commands to activate said FPGA logic unit, which triggers one of the relay units in said relay control unit.

11. The remote access power hub of claim 10, said Ethernet control unit comprising a modem unit coupled to said CPU, said modem unit communicating with said predetermined host using public telephone line and transferring said commands to said CPU for processing.

12. The remote access power hub of claim 10, wherein a plurality of RJ45 ports are implemented as the communications port, said Ethernet control unit further comprising an Ethernet switch for switching among a plurality of communications ports.

13. The remote access power hub of claim 1, wherein said Ethernet control unit comprises:
at least one communications port;
an ISA interface unit, coupled to said communications port;
a microcontroller coupled to said ISA interface unit;
a SRAM memory unit coupled to said ISA interface unit;
a CPU coupled to microcontroller;
a Flash RAM unit coupled to said CPU;
a field-programmable gate array ("FPGA") logic unit coupled to said CPU,
wherein
said communications port controllably connects to a predetermined network and to communicates with a predetermined host, said port receives commands in TCP/IP protocol from said predetermined host;
said ISA interface unit and said microcontroller are disposed to convert said commands from TCP/IP protocol to RS232 protocol for said CPU to operate, based on IP address setup in said SRAM memory unit;
said CPU controllably authenticates said commands in RS232 protocol based on serial number and password information stored in said Flash RAM unit;
if authenticated, said CPU controllably transfers said commands to activate said FPGA logic unit, which triggers one of the relay units in said relay control unit.

14. The remote access power hub of claim 13, said Ethernet control unit comprising a modem unit coupled to said CPU, said modem unit communicating with said predetermined host using public telephone line and transferring said commands to said CPU for processing.

15. The remote access power hub of claim 13, wherein a plurality of RJ45 ports are implemented as the communications port, said Ethernet control unit further comprising an Ethernet switch for switching among a plurality of communications ports.

16. A remote access power hub for an information kiosk supporting a plurality of peripheral devices, said information kiosk being powered by an AC inlet, comprising:
a relay control unit, said relay control unit controllably receiving a continuous AC power from said AC inlet;
a first DC power supply, said first DC power supply controllably receiving said continuous AC power from said AC inlet and generating a continuous DC power;
a relay control unit, said relay control unit controllably receiving and relaying said continuous AC power from said AC inlet and said continuous DC power from said DC power supply;
a power distribution unit, said power distribution unit receiving a DC power from said relay control unit, said DC power being unavailable when said relay control unit is triggering;
an Ethernet control unit, said Ethernet control unit controllably receiving said continuous DC power from said relay control unit, said Ethernet control unit controllably communicating with a predetermined host to receive commands through telecommunications network and converting said commands to RS232 protocol, said commands in RS232 protocol causing said relay control unit to reboot itself.

17. The remote access power hub of claim 16, further comprising:
a 24 VDC power supply, receiving a continuous AC power from said relay control unit and generating a 24 VDC power; and
said power distribution unit further comprising:
a 12 VDC terminal block for powering said peripherals with a 12 VDC power, which is not available when said relay control unit is triggering;
a 24 VDC terminal block for powering said peripherals with said 24 VDC power, which is not available when said relay control unit is triggering;
6 VDC/9 VDC terminal block for powering said peripherals with DC power, which is not available when said relay control unit is triggering;
a 5 VDC terminal block for powering USB devices connected to said remote access power hub with DC power, which is not available when said relay control unit is triggering.

18. The remote access power hub of claim 17, further comprising: additional AC outlets for generating AC power to external devices from said remote access power hub.

19. A remote access power hub for an information kiosk supporting a plurality of peripheral devices, said information kiosk being powered by an AC inlet, comprising:
a housing;
a relay control unit within said housing, said relay control unit controllably receiving a continuous AC power from said AC inlet;
a first DC power supply within said housing, said first DC power supply controllably receiving said continuous AC power from said AC inlet and generating a continuous DC power;
a relay control unit within said housing, said relay control unit controllably receiving and relaying said continuous AC power from said AC inlet and said continuous DC power from said DC power supply;
a power distribution unit within said housing, said power distribution unit receiving a DC power from said relay control unit, said DC power being unavailable when said relay control unit is triggering;
an Ethernet control unit within said housing, said Ethernet control unit controllably receiving said continuous DC power from said relay control unit, said Ethernet control unit controllably communicating with a predetermined host to receive commands through telecommunications network and converting said commands to RS232 protocol, said commands in RS232 protocol causing said relay control unit to reboot itself.

20. The remote access power hub of claim 19, further comprising:
a 24 VDC power supply within said housing, receiving a continuous AC power from said relay control unit and generating a 24 VDC power; and
said power distribution unit further comprising:

a 12 VDC terminal block for powering said peripherals with a 12 VDC power, which is not available when said relay control unit is triggering;

a 24 VDC terminal block for powering said peripherals with said 24 VDC power, which is not available when said relay control unit is triggering;

6 VDC/9 VDC terminal block for powering said peripherals with DC power, which is not available when said relay control unit is triggering;

a 5 VDC terminal block for powering USB devices connected to said remote access power hub with DC power, which is not available when said relay control unit is triggering.

21. The remote access power hub of claim 20, further comprising: additional AC outlets within said housing for generating AC power to external devices from said remote access power hub.

\* \* \* \* \*